Oct. 18, 1966  F. F. POLIZZANO  3,280,294
ELECTRIC ARC WELDING OF ALUMINUM
Filed Jan. 28, 1965  2 Sheets-Sheet 1
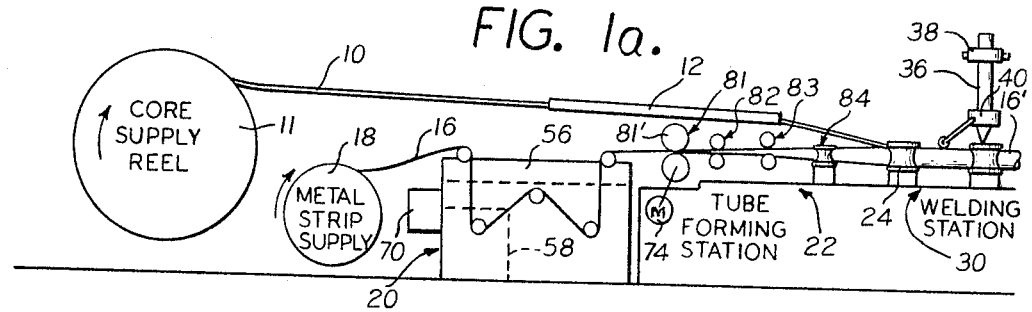
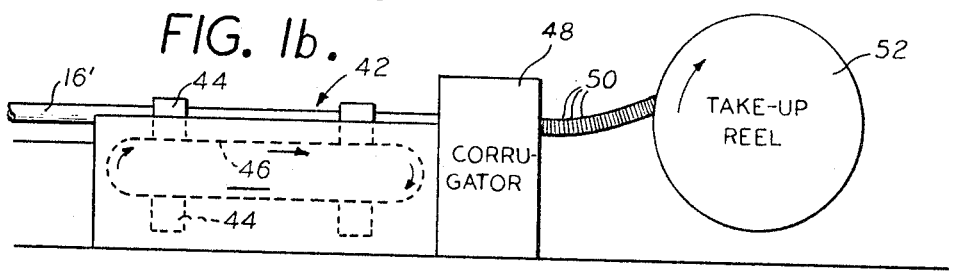
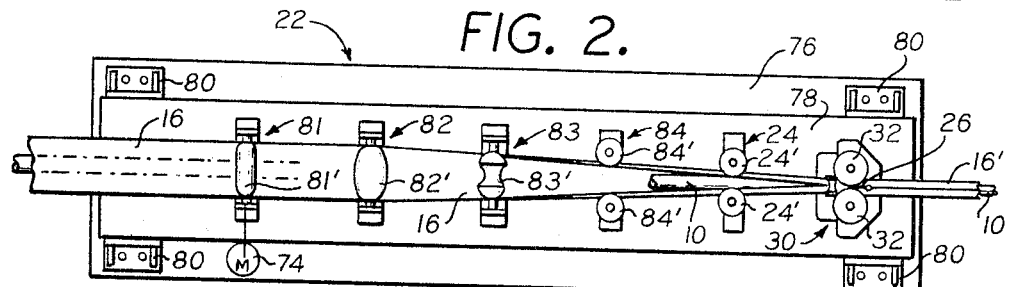
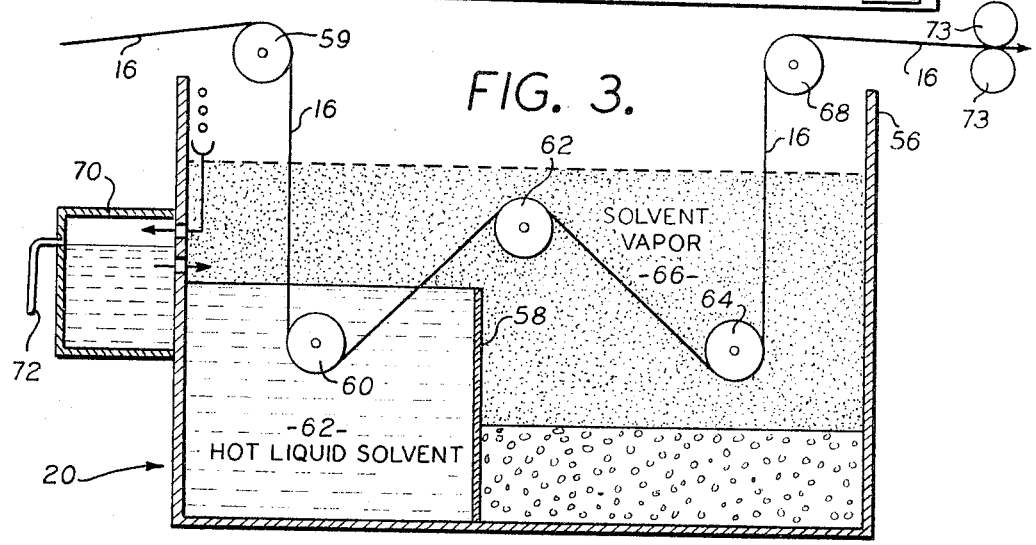
INVENTOR
FRED F. POLIZZANO
BY Emery, Whittemore,
Sandoe & Graham
ATTORNEYS.

Oct. 18, 1966  F. F. POLIZZANO  3,280,294
ELECTRIC ARC WELDING OF ALUMINUM
Filed Jan. 28, 1965  2 Sheets-Sheet 2
FIG. 4a.
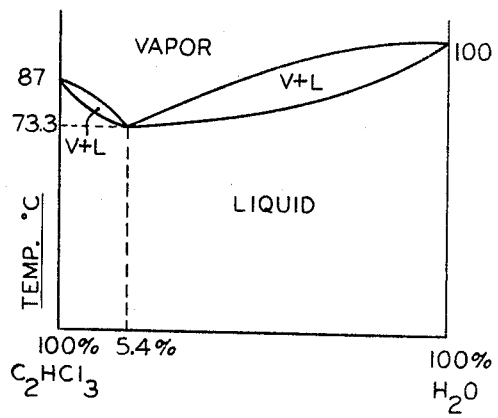
FIG. 4b.
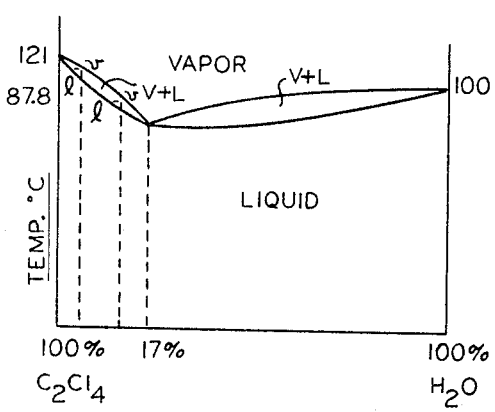
FIG. 5.
PRIOR ART
FIG. 6.
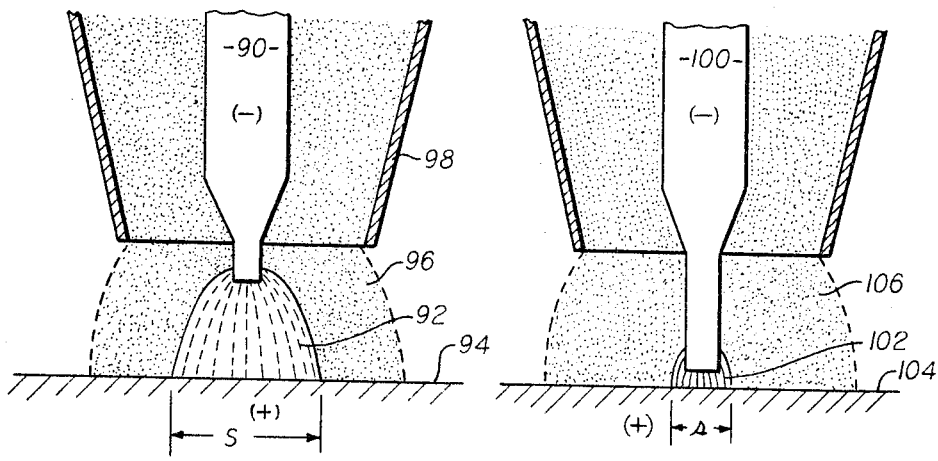
FIG. 7.
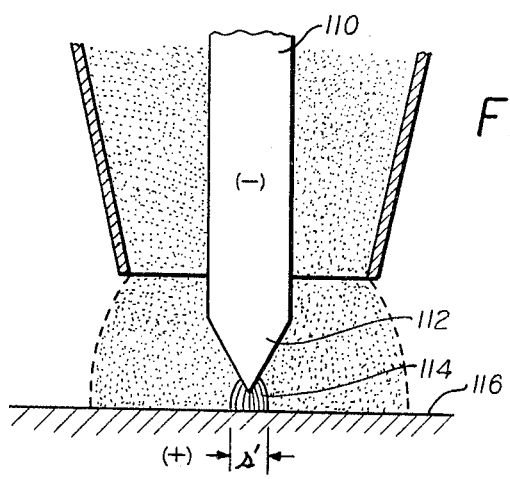
INVENTOR
FRED F. POLIZZANO
BY Emery, Whittemore,
Sandoe & Graham
ATTORNEYS.

3,280,294
ELECTRIC ARC WELDING OF ALUMINUM
Fred F. Polizzano, Allendale, N.J., assignor to General Cable Corporation, New York, N.Y., a corporation of New Jersey
Filed Jan. 28, 1965, Ser. No. 428,757
11 Claims. (Cl. 219—74)

This invention relates to electric arc welding and more particularly to the welding of aluminum.

It has been a common practice to weld practically all metals except aluminum and magnesium by direct-current straight polarity arcs. When such a welding arc is used, the negatively charged electrons are directed to the positively charged workpiece at fairly high velocity, and simultaneously positively charged gas ions formed in the plasma portion of the arc are directed toward the negative electrode at relatively low velocity. The electrons support most of the current conduction and flow through the plasma, which is the ionized state of the shielding gas, composed of approximately an equal number of electrons and ions. Collisions occur in this process, producing heat and as the electrons strike the work a considerable amount of heat is liberated. Greater heat is developed at the work than at the electrode and this results in welding advantages such as high welding speeds, deeper and narrower welds with smaller heat-affected zones, and longer electrode life.

This process has not been satisfactory for aluminum because melting of the metal occurs before the arc has any scouring effect on the surface oxides, and thus oxide-free flow and fusion are difficult and impractical.

It is an object of this invention to provide a modified direct-current straight polarity welding technique that can be used for welding aluminum. The process of this invention cleans the surface oxide from the metal to be welded, and avoids porosity by removing moisture from the metal ahead of the welding region which is protected in the usual way by an inert gas atmosphere.

Another object of the invention is to reduce the length of an electric arc so that collisions in the plasma of the arc are reduced drastically and electron bombardment of the workpiece becomes effective in dislodging any oxide surface layer at a rate which is faster than that at which the metal is melted, thereby obtaining oxide-free flow and fusion of the metal. In the preferred embodiment, the electrode is sharp, with either a spaded or pointed end which reduces the cross section of the arc, transversely of its direction of travel, with resulting increase in the intensity of the arc.

As compared with alternating-current welding, this invention attains higher welding speed. As compared with reverse-polarity welding, this invention can weld with smaller electrodes that do not require water cooling and that are, therefore, more practical. The invention obtains fast welding speed; long electrode life; a narrow weld bead; and freedom from porosity.

Other objects, features and advantages of the invention will appear or be pointed out as the description proceeds.

In the drawing, forming a part hereof, in which like reference characters indicate corresponding parts in all the views:

FIGURES 1a and 1b are diagrammatic showings of apparatus for making aluminum-sheathed electric cable in accordance with the method of this invention;

FIGURE 2 is a greatly enlarged top plan view of the tube-forming station and welding station shown in FIGURE 1a;

FIGURE 3 is a greatly enlarged sectional view through the moisture-removing apparatus shown in FIGURE 1a;

FIGURE 4a is a trichlorethylene-water equilibrium diagram;

FIGURE 4b is a perchlorethylene-water equilibrium diagram;

FIGURE 5 is a greatly enlarged diagrammatic sectional view illustrating direct-current straight polarity welding in an inert gas atmosphere in accordance with the prior art;

FIGURE 6 is a diagrammatic view, similar to FIGURE 5 but showing the welding of a workpiece by the method of this invention; and FIGURE 7 is a view similar to FIGURE 6 but showing a modified form of the invention in which the electrode has a spaded or pointed end.

FIGURES 1a and 1b show apparatus for making an aluminum-sheathed electric cable. A preformed core 10 of assembled electrical conductors is unwound from a core supply reel 11 and advanced across a supporting tray 12 to a welding station 30. An aluminum strip 16 is unwound from a strip supply coil 18 and with the aluminum strip 16 in a transversely flat condition, it is passed through a moisture-removing tank 20.

Beyond the tank 20, the aluminum strip 16 passes through successive roll stands of a tube-forming station 22. In a last roll stand 24, of the tube-forming station 22, the core 10 is fed into the forming tube.

The edges of the aluminum strip 16 are brought together to make a butt seam as the formed tube enters a roll pass 26 at a welding station 30. The roll pass 26 is formed between two rolls 32 on opposite sides of the formed tube, indicated by the reference character 16'.

An electrode 36 is held in a support 38 at the welding station 30. This electrode has its lower end positioned over the seam of the tube 16' at the welding station, and shielding gas is flowed over the region of the weld from a hood 40.

Beyond the welding station 30, the tube 16' with the core 10 located in it, is advanced by an endless belt feeder 42 having clamp-type grippers 44 connected at spaced locations around an endless belt 46. The feeder 42 advances the tube 16' to a corrugator 48 in which the tube 16', which forms the sheath of the cable core 10, is corrugated with circumferentially extending corrugations 50 to produce a flexible sheath; and the cable with this flexible sheath is wound on a take-up reel 52.

FIGURE 3 shows the moisture-removing tank 20. This tank is structurally similar to commercially available vapor degreasers. It includes a large tank 56 in which a smaller tank 58 is located. The aluminum strip 16 passes over a roller 59 that changes the direction of travel of the strip 16, and the strip 16 travels downward and around a second roller 60, located in the smaller tank 58. There is a hot liquid solvent 62 in the smaller tank 58 and the aluminum strip travels through this hot liquid solvent during passage downward and around the roller 60 and during subsequent passage upward to a third roller 62 located above and beyond the hot liquid solvent tank 58.

The roller 62 and a subsequent roller 64 are located in a part of the larger tank 56 which is filled with solvent vapor 66. Beyond the roller 64, the strip 16 travels upward beyond the top of the tank 56 and around another roller 68 which changes the direction of travel of the strip so that it advances toward the tube-forming station.

The solvent used in the tanks 56 and 58 is trichlorethylene or perchlorethylene, or some other solvent which will remove moisture from the surface of the strip 16. The solvent vapor and its associated moisture pass from the tank 56 into a water separator 70 where the solvent is condensed and then returned to the tank 58, and the water is withdrawn through a discharge pipe 72.

Equilibrium diagrams for water with trichlorethylene and perchlorethylene are shown in FIGURES 4a and 4b, respectively. These illustrate the principle of the vapor moisture remover. The detailed construction of the moisture-removal apparatus is not a part of this invention and no further description of it is necessary for a complete understanding of the invention. Other means for removing moisture from the strip 16 can be used, but that illustrated has the advantage of being highly effective and well-suited for use in a continuous process.

The aluminum strip 16 is pulled through the tanks 56 and 58 by feed rolls 81' located above and below the strip 16 and driven by a motor 74 at a controlled speed.

The tube-forming station 22 is shown in FIGURE 2. It includes a base 76 which supports a frame 78 attached to the base 76 by brackets 80. There are three roll stands 81, and 82 and 83 with upper and lower rolls indicated by the same reference characters as the roll stands but with a prime appended. The rolls in these first three stands 81–83 are mounted for rotation about horizontal axes.

A fourth roll stand 84 has rolls 84' located on opposite sides of the forming strip 16; and these rolls 84' are supported on vertical axes and preferably with adjustment toward and from one another in accordance with conventional practice for tube-forming mills.

The forming tube 16 then passes through the last roll stand 24 of the tube forming station where rolls 24' bring the edges of the strip 16 closer together while the core 10 is fed into the forming tube at a location where the seam is still open wide enough to receive the core 10.

At the welding station 30 the strip 16 is fully formed by the time it passes through the roll pass 26, and at a location adjacent to the roll pass 26, the seam of the tube is welded, as previously described.

FIGURE 5 shows an electrode 90 from which an electric arc 92 is discharged against a workpiece 94. For direct-current, straight polarity welding, the electrode 90 has negative polarity and the workpiece 94 has positive polarity. An atmosphere of inert shielding gas 96 is discharged around the arc 92 and over the workpiece 94 from a shield 98. The arc 92 spreads as it advances toward the workpiece 94 and has an effective width S at the surface of the workpiece. The arc length between the electode 90 and the workpiece 94 is of the order of 0.040 inch and greater in conventional welding; such as shown in FIGURE 5.

Such a process is unsatisfactory for aluminum because the arc does not clean the oxide layer from the aluminum before the metal melts. Thus oxide is included in the weld and the strength of the weld is impaired.

The present invention includes the discovery that a direct-current, straight polarity electric arc can be made to scour the oxide layer from aluminum, before the metal melts, if the arc is made much shorter than conventional arcs. FIGURE 6 shows an electrode 100 directing an arc 102 against a workpiece 104 while the arc and workpiece are protected by atmosphere of inert shielding gas 106. The electrode 100 is kept within 0.020 inch of the workpiece 104, and because of this shorter distance, the arc spot on the workpiece 104 has a width $s$.

It is the theory of this invention that the use of a shorter arc reduces the number of collisions which the electrons encounter in the plasma of the arc during their travel from the electrode to the workpiece; and by reducing the number of collisions, the electrons strike the oxide layer with greater energy and velocity, and the electron bombardment is effective in dislodging the oxide layer at a rate which is faster than that at which the aluminum is melted. The shorter arc length reduces the cross section and thus increases the current density. The shorter arc length increases the arc voltage and thereby increases the electron energy.

In some processes of the prior art, short arc lengths and even processes with no arcs have been used, but these processes are for techniques using coated electrodes where the non-conducting coating touches the work to be welded and oxides are removed by the chemical action of the coating or flux. This is a different kind of welding, and the present inventions is an improvement in welding with direct-current, straight polarity using arch shielded with inert gas atmospheres.

The optimum length of the arc 102 depends upon the gas which is used for shielding. Experience has shown that with helium, the arc 102 should not be longer than about 0.015 inch. When helium is mixed with 25% argon, a shorter arc gives better results for the same weld bead, the arc length should not be greater than approximately 0.010 inch. With argon used as the shielding gas without any helium, an even shorter arc is necessary to produce the same weld bead, the maximum arc length for best results being approximately 0.005 inch.

Since extremely short spacings of the electrode from the workpiece are difficult to maintain with accuracy, it is advantageous to use helium or at least a percentage of helium in the inert gas shield 106 of this invention. Using the same flow rate (about ten cubic feet per hour), the plasma density is lower for helium than for argon and electron energy dissipation by collision with gas ions is lower for helium than for argon, thus making longer arc lengths suitable with the lighter gas to produce the same cleaning effect on the aluminum oxide.

Even better results are obtained by using a sharp electrode 110, such as shown in FIGURE 7. This electrode has a discharge end 112 which is sharpened to a point or is spade-shaped so as still further to reduce the cross section of an arc 114 which is discharged from the electrode 110 to a workpiece 116. This reduced arc width $s'$ produces a more pronounced cleaning effect because the electron flow density is increased. In the preferred operation of the invention, the electrodes used are tungsten.

The preferred embodiment of the invention has been illustrated and described, but changes and modifications can be made and some features may be used in different combinations without departing from the invention as defined in the claims.

What is claimed is:

1. In the welding of aluminum by a direct-current electric arc with the workpiece of positive polarity, the improvement which comprises discharging the arc from an electrode to the workpiece through the plasma of an ionized inert shielding gas, reducing the collisions of the electrons with the ions in the plasma by maintaining the electrode within about 0.020 inch of the workpiece, and maintaining a current density of the electron bombardment of the workpiece such that scouring of oxide coating from the aluminum to be welded is effected before the metal is melted by the arc.

2. The method described in claim 1 characterized by welding with an electrode-workpiece spacing of about 0.015 inch while shielding the arc and workpiece with an atmosphere of helium.

3. The method described in claim 1 characterized by welding with an electrode-workpiece spacing of 0.010 inch and shielding the arc and workpiece with an atmosphere of helium mixed with approximately 25% of argon.

4. The method described in claim 1 characterized by welding with an electrode-workpiece spacing of 0.005 inch and shielding the arc and workpiece with an atmosphere of argon.

5. The method described in claim 1 characterized by removing moisture from the metal by vapor phase cleaning immediately prior to the application of the arc to the metal.

6. The method described in claim 5 characterized by performing the vapor phase cleaning by passing the aluminum through a hot liquid solvent and then into a space containing vapor of the solvent, and circulating the vapor from said space through a water separator.

7. The method described in claim 6 characterized by the hot liquid solvent having equilibrium with water at a temperature substantially less than the boiling points of both the solvent and the water.

8. The method described in claim 7 characterized by removing the moisture with a solvent from the group consisting of trichlorethylene and perchlorethylene.

9. The method described in claim 1 characterized by discharging the arc from an electrode having a sharp end confronting the workpiece.

10. The method described in claim 9 characterized by discharging the arc from a pointed end of an electrode.

11. The method described in claim 1 characterized by passing aluminum strip through a moisture-removing step with the strip in a transversely flat condition, forming the strip, as it comes from the moisture-removing step, into a tube with a butt seam, feeding a preformed core of electrical conductors into the tube at an intermediate stage of the forming operation, and then welding the seam closed.

References Cited by the Examiner

UNITED STATES PATENTS

| | | | |
|---|---|---|---|
| 2,591,926 | 4/1952 | Gibson et al. | 219—74 |
| 2,681,402 | 6/1954 | Muller | 219—74 |
| 2,756,309 | 7/1956 | Donelan | 219—60 |
| 3,023,300 | 2/1962 | Lehnert | 219—60 |

References Cited by the Applicant

"Welding Handbook," Sec. 1, Chap. 5, Physics of Welding-Arc Characteristics, American Welding Society, 1962.

"Welding Handbook," Sec. 2, Chap. 27, Gas Shielded-Arc Welding, American Welding Society, 1963.

Kammer, P. A., et al.: "The Relation of Filler Wire Hydrogen to Aluminum-Weld Porosity," Supplement Welding Journal, October 1963.

RICHARD M. WOOD, *Primary Examiner.*